United States Patent
Chauhan et al.

(10) Patent No.: US 12,008,589 B2
(45) Date of Patent: *Jun. 11, 2024

(54) DISCOVERING CAUSAL RELATIONSHIPS IN MIXED DATASETS

(71) Applicant: Adobe Inc., San Jose, CA (US)

(72) Inventors: Ayush Chauhan, Meerut (IN); Vineet Malik, Hisar (IN); Sourav Suman, Kendrapara (IN); Siddharth Jain, Kota (IN); Gaurav Sinha, Bangalore (IN); Aayush Makharia, Surat (IN)

(73) Assignee: Adobe Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/362,833

(22) Filed: Jul. 31, 2023

(65) Prior Publication Data

US 2023/0385854 A1    Nov. 30, 2023

Related U.S. Application Data

(63) Continuation of application No. 17/097,508, filed on Nov. 13, 2020, now Pat. No. 11,763,325.

(51) Int. Cl.
*G06Q 30/0201*    (2023.01)
*G06F 16/901*    (2019.01)
*G06N 7/01*    (2023.01)
*G06N 20/00*    (2019.01)

(52) U.S. Cl.
CPC ..... *G06Q 30/0201* (2013.01); *G06F 16/9024* (2019.01); *G06N 7/01* (2023.01); *G06N 20/00* (2019.01)

(58) Field of Classification Search
CPC ...... G06Q 30/0201; G06N 20/00; G06N 7/01; G06F 16/9024
See application file for complete search history.

(56) References Cited

U.S. PATENT DOCUMENTS

| | | | |
|---|---|---|---|
| 2011/0161280 A1* | 6/2011 | Luo | G06F 16/285 707/604 |
| 2014/0351198 A1* | 11/2014 | Isozaki | G06N 7/01 706/54 |
| 2016/0171383 A1* | 6/2016 | Narain | G16H 50/50 706/52 |
| 2019/0096102 A1* | 3/2019 | Weissbrod | G06T 11/206 |

OTHER PUBLICATIONS

Andrews (Scoring Bayesian Networks of Mixed Variables, International Journal of Data Science and Analytics, 6(1):3(18, 2018) (Year: 2018).*

(Continued)

*Primary Examiner* — Apu M Mofiz
*Assistant Examiner* — Farhad Agharahimi
(74) *Attorney, Agent, or Firm* — Keller Preece PLLC

(57) ABSTRACT

Introduced here are approaches to determining causal relationships in mixed datasets containing data related to continuous variables and discrete variables. To accomplish this, a marketing insight and intelligence platform may employ a multi-phase approach in which dependency is established before the data related to continuous variables is discretized. Such an approach ensures that information regarding dependence is not lost through discretization.

20 Claims, 12 Drawing Sheets

(56) References Cited

OTHER PUBLICATIONS

Alberto Cano, Jose Maria Luna, Eva L Gibaja, and Sebastian Ventura. Laim discretization for multilabel data. Information Sciences, 330:370{384, 2016.

Bryan Andrews, Joseph Ramsey, and Gregory F Cooper. Scoring bayesian networks of mixed variables. International journal of data science and analytics, 6(1 ):3{18, 2018.

David Maxwell Chickering. Optimal structure identication with greedy search. Journal of machine learning research, 3 Nov):507-554, 2002.

Ignavier Ng, Shengyu Zhu, Zhitang Chen, and Zhuangyan Fang. A graph autoencoder approach to causal structure learning. arXiv preprint arXiv:1911.07420, 2019.

Ioannis Tsamardinos, Laura E Brown, and Constantin F Aliferis. The max-min hill-climbing bayesian network structure learning algorithm. Machine learning, 65(1 ):31-78, 2006.

Joseph Ramsey, Madelyn Glymour, Ruben Sanchez-Romero, and Clark Glymour. A million variables and more: the fast greedy equivalence search algorithm for learning high-dimensional graphical causal models, with an application to functional magnetic resonance images. International journal of data science and analytics, 3(2):121-129, 2017.

Krzysztof Chalupka, Pietro Perona, and Frederick Eberhardt. Fast conditional independence test for vector variables with large sample sizes. arXiv preprint arXiv:1804.02747, 2018.

L. Gonzalez-Abril, Francisco Javier Cuberos, Francisco Velasco, and Juan Antonio Ortega. Ameva: An autonomous discretization algorithm. Expert Systems with Applications, 36(3):5327-5332, 2009.

Lukasz A Kurgan and Krzysztof J Cios. CAIM discretization algorithm. IEEE transactions on Knowledge and Data Engineering, 16(2):145-153, 2004.

Mary L McHugh. The chi-square test of independence. Biochemia medica: Biochemia medica, 23(2):143-149, 2013.

Maxime Gasse, Alex Aussem, and Haytham Elghazel. A hybrid algorithm for bayesian network structure learning with application to multi-label learning. Expert Systems with Applications, 41(15):6755-6772, 2014.

Nir Friedman, Moises Goldszmidt, et al. Discretizing continuous attributes while learning bayesian networks. In ICML, pp. 157-165, 1996.

Peter Spirtes, Clark N Glymour, Richard Scheines, and David Heckerman. Causation, prediction, and search. MIT press, 2000.

Sebastien Lachapelle, Philippe Brouillard, Tristan Deleu, and Simon Lacoste-Julien. Gradient-based neural dag learning. arXiv preprint arXiv:1906.02226, 2019.

Stefano Monti and Gregory F Cooper. A multivariate discretization method for learning bayesian networks from mixed data. arXiv preprint arXiv:1301.7403, 2013.

Supervised Discretization, Bayesialab. https://library.bayesia.com/articles/#!bayesialab- knowledge-hub/6-supervisedearning/a/h3_544227556. (Retrieved from the Internet Feb. 11, 2021).

Univariate Discretization, Bayes Server. https://www.bayesserver.com/api/java/index.html?com/bayesserver/data/discovery/Discretize.html. (Retrieved from the Internet Feb. 11, 2021).

Unsupervised Discretization, Bayesialab. https://library.bayesia.com/articles/#!bayesialab-knowledge-hub/7-unsupervised-learning/a/h4_ 1835183166. (Retrieved from the Internet Feb. 11, 2021).

Vineet K Raghu, Allen Poon, and Panayiotis V Benos. Evaluation of causal structure learning methods on mixed data types. Proceedings of machine learning research, 92:48, 2018.

Xun Zheng, Bryon Aragam, Pradeep Ravikumar, and Eric P. Xing. Dags with no tears: Continuous optimization for structure learning. In Proceedings of the 32nd International Conference on Neural Information Processing Systems, NIPS'18, p. 9492(9503, Red Hook, NY, USA, 2018. Curran Associates Inc.

Yue Yu, Jie Chen, Tian Gao, and Mo Yu. Dag-gnn: Dag structure learning with graph neural networks. arXiv preprint arXiv:1904.10098, 2019.

U.S. Appl. No. 17/097,508, Oct. 4, 2022, Pre-Interview First Office Action.

U.S. Appl. No. 17/097,508, Dec. 13, 2022, First Action Interview—Office Action.

U.S. Appl. No. 17/097,508, May 22, 2023, Notice of Allowance.

* cited by examiner

| Dataset | Algorithm | AP* | AR* | AF* | AHP* | AHR* | AHF* | SHD | SHDC |
|---|---|---|---|---|---|---|---|---|---|
| Small | PC | 100 | 100 | 100 | 100 | 84.6 | 91.7 | 2 | 0 |
| | MMHC | 100 | 92.3 | 96.0 | 41.7 | 41.7 | 41.7 | 8 | 6 |
| | FGES | 100 | 100 | 100 | 91.6 | 84.6 | 88.0 | 2 | 1 |
| | Multi-Phase | 100 | 100 | 100 | 100 | 92.3 | 96.0 | 1 | 0 |
| Medium | PC | 100 | 68.6 | 81.4 | 62.5 | 42.8 | 50.8 | 36 | 31 |
| | MMHC | 100 | 58.8 | 74.0 | 70.0 | 70.0 | 70.0 | 30 | 33 |
| | FGES | 97.6 | 80.4 | 88.2 | 84.6 | 78.6 | 81.5 | 18 | 18 |
| | Multi-Phase | 95.6 | 84.3 | 89.6 | 84.1 | 86.0 | 85.0 | 16 | 18 |
| Large | PC | 100 | 80.0 | 88.9 | 90.0 | 64.3 | 75.0 | 34 | 25 |
| | MMHC | 100 | 58.6 | 73.9 | 68.3 | 68.3 | 68.3 | 42 | 45 |
| | FGES | 98.5 | 94.3 | 96.4 | 85.0 | 76.1 | 80.3 | 19 | 13 |
| | Multi-Phase | 95.8 | 98.6 | 97.2 | 90.6 | 84.1 | 87.2 | 15 | 8 |
| Massive | PC | 97.6 | 77.7 | 86.5 | 71.0 | 55.0 | 62.0 | 61 | 51 |
| | MMHC | 98.3 | 55.3 | 70.8 | 74.1 | 75.4 | 74.7 | 61 | 66 |
| | FGES | 98.0 | 94.2 | 96.1 | 83.5 | 71.7 | 77.2 | 32 | 25 |
| | Multi-Phase | 96.1 | 97.1 | 96.6 | 85.3 | 81.0 | 83.1 | 26 | 17 |

*Metric is reported as a percentage.

| Dataset | Discretization | AP* | AR* | AF* | AHP* | AHR* | AHF* | SHD | SHDC |
|---|---|---|---|---|---|---|---|---|---|
| Small | Uniform | 100 | 100 | 100 | 100 | 92.3 | 96.0 | 1 | 0 |
| | Quantile | 100 | 100 | 100 | 91.7 | 84.6 | 88.0 | 2 | 1 |
| | K-Means | 100 | 100 | 100 | 91.7 | 84.6 | 88.0 | 2 | 1 |
| Medium | Uniform | 97.7 | 86.3 | 91.6 | 85.7 | 81.8 | 83.7 | 16 | 16 |
| | Quantile | 100 | 84.3 | 91.5 | 85.0 | 79.1 | 81.9 | 17 | 17 |
| | K-Means | 100 | 86.3 | 92.6 | 87.8 | 81.8 | 84.7 | 15 | 15 |
| Large | Uniform | 91.9 | 97.1 | 94.4 | 88.7 | 69.1 | 77.7 | 29 | 15 |
| | Quantile | 100 | 97.1 | 98.5 | 93.9 | 67.6 | 78.6 | 24 | 9 |
| | K-Means | 100 | 97.1 | 98.5 | 93.9 | 67.6 | 78.6 | 24 | 9 |
| Massive | Uniform | 99.0 | 98.0 | 98.5 | 87.5 | 76.2 | 81.5 | 27 | 16 |
| | Quantile | 100 | 96.1 | 98.0 | 87.5 | 77.7 | 82.3 | 26 | 15 |
| | K-Means | 100 | 96.1 | 98.0 | 87.5 | 77.7 | 82.3 | 26 | 15 |

*Metric is reported as a percentage.

FIGURE 5

| Dataset | Algorithm | AP* | AR* | AF* | AHP* | AHR* | AHF* | SHD | SHDC |
|---|---|---|---|---|---|---|---|---|---|
| Small | PC | 100 | 100 | 100 | 100 | 92.3 | 96.0 | 1 | 0 |
| | MMHC | 100 | 100 | 100 | 92.3 | 92.3 | 92.3 | 1 | 0 |
| | FGES | 100 | 100 | 100 | 100 | 92.3 | 96.0 | 1 | 0 |
| | Multi-Phase | 100 | 100 | 100 | 100 | 92.3 | 96.0 | 1 | 0 |
| Medium | PC | 100 | 68.6 | 81.4 | 67.0 | 51.4 | 58.2 | 33 | 28 |
| | MMHC | 100 | 64.7 | 78.6 | 76.0 | 76.0 | 76.0 | 26 | 29 |
| | FGES | 97.8 | 86.3 | 91.7 | 88.1 | 84.1 | 86.0 | 15 | 15 |
| | Multi-Phase | 95.6 | 84.3 | 89.6 | 84.1 | 86.0 | 85.0 | 16 | 18 |
| Large | PC | 100 | 82.9 | 90.6 | 72.9 | 60.3 | 66.0 | 35 | 33 |
| | MMHC | 100 | 70 | 82.4 | 67.3 | 67.3 | 67.3 | 37 | 40 |
| | FGES | 100 | 95.7 | 97.8 | 86.9 | 79.1 | 82.8 | 17 | 11 |
| | Multi-Phase | 95.8 | 98.6 | 97.2 | 90.6 | 84.1 | 87.2 | 15 | 8 |
| Massive | PC | 100 | 79.6 | 88.6 | 78.0 | 78.0 | 78.0 | 39 | 38 |
| | MMHC | 100 | 65.0 | 78.8 | 76.1 | 76.1 | 76.1 | 52 | 54 |
| | FGES | 99.0 | 99.0 | 99.0 | 90.9 | 78.4 | 84.2 | 24 | 10 |
| | Multi-Phase | 96.1 | 97.1 | 96.6 | 85.3 | 81.0 | 83.1 | 26 | 17 |

*Metric is reported as a percentage.

FIGURE 7

DISCOVERING CAUSAL RELATIONSHIPS IN MIXED DATASETS

CROSS-REFERENCE TO RELATED APPLICATIONS

The present application is a continuation of U.S. application Ser. No. 17/097,508, filed on Nov. 13, 2020. The aforementioned application is hereby incorporated by reference in its entirety.

TECHNICAL FIELD

Various embodiments concern computer programs and associated computer-implemented techniques for determining causal relationships in mixed datasets containing data related to continuous variables and discrete variables.

BACKGROUND

Causal research (also referred to as "explanatory research") is the investigation of cause-and-effect relationships. To determine causality, it is important to observe variation in one variable that is assumed to cause changes in another variable and then measure the changes, if any, in the other variable. Various statistical approaches have been developed to determine causality while controlling for confounding influences that may distort the results. However, these approaches struggle to properly determine causality amongst variables when the underlying dataset contains data related to continuous variables and discrete variables.

BRIEF DESCRIPTION OF THE DRAWINGS

FIG. 5 includes a comparison of different univariate discretization strategies with the Fast Greedy Equivalence Search (FGES) while keeping a fixed number of discretization bins.

FIG. 7 shows the comparison of the multi-phase approach with the three baselines along 8 evaluation metrics after fine tuning.

Figure 1:
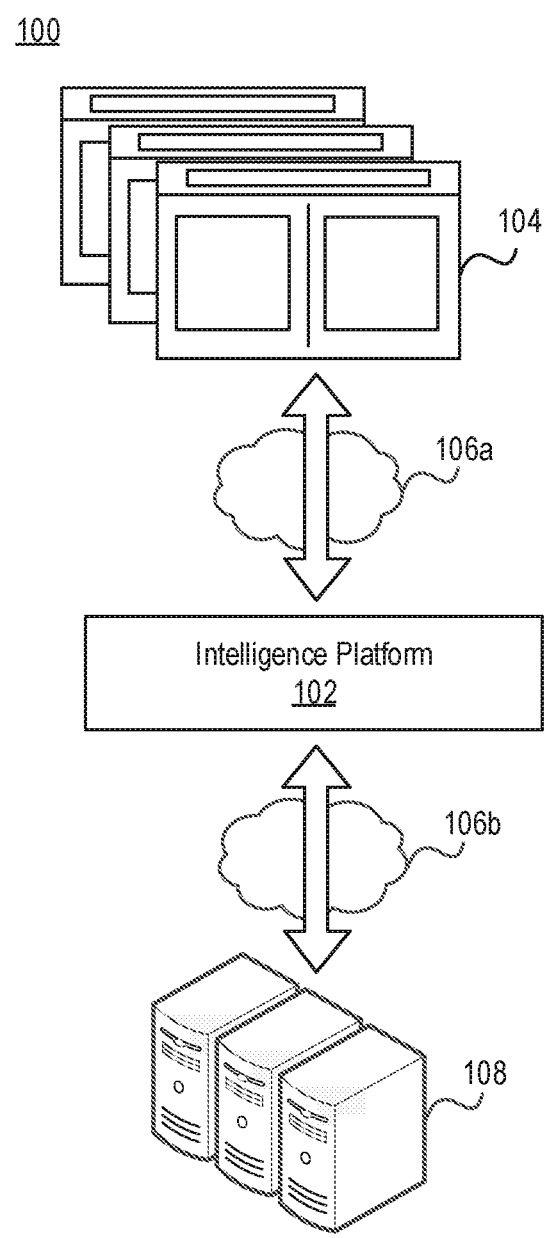
FIG. 1 illustrates a network environment that includes a marketing insight and intelligence platform that is able to execute instructions for discretizing mixed datasets while preserving the causal relationships between continuous and discrete variables.

Various features of the technologies described herein will become more apparent to those skilled in the art from a study of the Detailed Description in conjunction with the drawings. Embodiments are illustrated by way of example and not limitation in the drawings, in which like references may indicate similar elements. While the drawings depict various embodiments for the purpose of illustration, those skilled in the art will recognize that alternative embodiments may be employed without departing from the principles of the technologies. Accordingly, while specific embodiments are shown in the drawings, the technology is amenable to various modifications.

DETAILED DESCRIPTION

Algorithms designed for determining causal relationships in data can be broadly classified into three categories: constraint-based approaches, score-based approaches, and hybrid approaches. In constraint-based approaches, the learning mechanism of the algorithm systematically checks the data for conditional independent relationships and uses those relationships as constraints to construct a graphical model (also referred to as a "graphical structure" or "graph") that is representative of a Bayesian network equivalent class. In score-based approaches, the learning mechanism of the algorithm utilizes a scoring function to evaluate how well different graphs fit the data. Hybrid approaches attempt to incorporate the best aspects of constraint- and score-based approaches. In hybrid approaches, the learning mechanism of the algorithm learns an undirected graph in accordance with a constraint-based approach during a learning phase and then employs the undirected graph as a constraint on directed graphs that are considered during a scoring phase.

While there are algorithms that can be directly applied to mixed datasets containing continuous and discrete variables, those algorithms are not designed to handle non-homogenous data. Constraint-based approaches designed for mixed datasets require conditional independence tests that can handle such data, and such tests are not readily available. Constraint-based approaches are also infeasible due to the amount of time needed to process non-homogeneous data, as well as the fact that outputs are limited to only equivalence classes of Bayesian networks. Further, constraint-based approaches are highly sensitive to the quality of tests performed, and with finite mixed data provided as input, one incorrect test may lead to errors being compounded in subsequent steps.

Some score-based approaches, such as Fast Greedy Equivalence Search (FGES), rely on scoring functions that are able to handle mixed datasets. However, scoring functions that are able to handle mixed datasets are unable to properly capture the relationships between continuous and discrete variables. In short, these scoring functions tend to evaluate the mixed dataset in such a manner that causal relationships between continuous and discrete variables are lost. Other score-based approaches, such as Directed Acyclic Graph with Graph Neural Networks (DAG-GNN) or Generalized Advantage Estimation (GAE), use deep neural networks to learn the causal relationships. But again, these score-based approaches are primarily designed to handle data related to continuous variables. While these score-based approaches can be tuned or trained to handle data related to discrete variables, those approaches are not designed to work with both continuous and discrete variables together.

Many businesses have begun to rely heavily on automation-driven insights to deliver new experiences to customers. Those new experiences may be offered as frequently as every visit. As such, it is critical that the effect of the experience is understood prior to it being offered. Several approaches have been developed in an attempt to understand the impact of experiences. One such example is A/B testing. In A/B testing, two variants (e.g., a first experience and a second experience) are compared based on the responses to those variants being offered to customers. In many situations, however, these approaches are either not feasible from a technical perspective (e.g., too time or resource intensive) or too costly, thereby motivating the need for estimating impact using observational data itself.

An observational approach requires an in-depth "causal" analysis that controls for multiple aspects of customer-related features. Several examples of features are provided in Table I. Features like those mentioned below may be discovered or derived by a marketing insight and intelligence platform (or simply "intelligence platform") that is designed to transform ingested data into profiles, perform analytics, and the like.

TABLE I

Examples of features that may be captured by an intelligence platform.

| Customer Feature | Data Type |
|---|---|
| Device Type | Categorical |
| Returning Customer | Boolean |
| Geo-Country | Categorical |
| Number of Products Viewed | Numerical |
| Average Page Load Time | Numerical |
| Signed Up | Boolean |

A rich set of features can be a significant benefit. Assume, for example, that an intelligence platform creates a profile for a customer that specifies one or more features. In such a scenario, the profile can be fed into an algorithm that is designed to learn causal relationships in the form of Bayesian networks. Several algorithms have been developed with this goal in mind. However, these algorithms expected the data provided as input to be homogeneous. That is, these algorithms expected all data to relate to either continuous variables or discrete variables. This creates a major bottleneck in applying those algorithms to customer data since it will inevitably contain data related to continuous and discrete variables. Said another way, learning causal relationships in the form of Bayesian networks is difficult, if not impossible, since the customer data must first be homogenized, a process in which information helpful in establishing causality will be lost.

While continuous embedding of discrete variables or discretization of continuous variables seem like plausible approaches, these approaches come with several technical challenges. First, continuous embedding of discrete variable with many categories will either be highly dimensional or require appropriate tuning of those dimensions to properly capture causal dependencies. Deriving causal relationships in original variables from embedded variables is also not a straightforward process. Second, univariate discretization techniques (e.g., those involving k-means clustering, quantile discretization transforms, etc.) are naturally not aimed at preserving or recognizing causal dependencies. Meanwhile, multivariate discretization techniques are either not scalable or, if they are, prone to losing information regarding causal dependency.

Introduced here, therefore, are algorithmic approaches to uncovering causal relationships in mixed datasets containing data related to continuous variables and discrete variables. Motivated by the challenges mentioned above, the present disclosure concerns a scalable approach to determining causal relationships in mixed datasets through data-driven discretization of continuous variables such that loss in information regarding causal dependences is minimized. As further discussed below, the approach can readily be scaled to a tens or hundreds of variables.

Assume that an entity wishes to understand the causal relationship between variables in a mixed dataset. As an example, the mixed dataset may include information about various features of an individual whose behavior the entity wishes to better understand. Some features may be represented as continuous variables, while other features may be represented as discrete variables. To accomplish this, an intelligence platform may employ a multi-phase hybrid approach designed to handle mixed datasets.

In the first phase, the intelligence platform can apply a constraint-based algorithm directly on the mixed dataset to establish dependency before discretizing the underlying data. More specifically, the intelligence platform may use conditional independence tests over the mixed dataset to establish pairwise dependency. One example of a conditional independence test is the Fast Conditional Independence Test (FCIT) that is able to determine conditional independence between data of different types (e.g., numeric data of a continuous variable and categorical or Boolean data of a discrete variable). As further discussed below, for each pair of variables in the mixed dataset, a conditional independence test may produce an output that is indicative of dependency. Using these metrics, the intelligence platform can (i) produce an undirected graph indicating dependency among the variables and (ii) identify the neighbors of each variable.

In the second phase, the intelligence platform can use the dependencies learned in the first phase to perform data-driven discretization of the mixed dataset. Thus, the intelligence platform can discretize data in the mixed dataset related to each continuous variable in order to produce a fully discretized dataset. Discretization may be accomplished by applying an algorithm that is designed to retain the undirected dependencies identified in the first step, thereby inflicting minimal loss in causal information. For example, the intelligence platform may discretize the data related to each continuous variable using a single-variable supervised discretization algorithm.

In the third step, the fully discretized dataset and undirected graph are fed into a scoring function designed to output a directed graph. Said another way, the intelligence platform can perform a greedy search over the space of candidate directed graphs using a scoring function that evaluates how well each candidate directed graph fits the fully discretized dataset. The edges absent in the undirected graph returned in the first phase are also forbidden in the final directed graph. Various search-and-score algorithms could be employed by the intelligence platform in the third phase, so long as those algorithms work on discretized data and allows forbidden edges as input. As an example, the intelligence platform may use the Fast Greedy Equivalence Search (FGES) along with scores produced by a Bayesian Dirichlet likelihood-equivalence uniform joint distribution (BDeu) scoring function on the fully discretized dataset produced in the second phase.

Note that the directed graph could be employed in a variety of contexts. As an example, a visual representation of the directed graph could be posted to an interface for review by an individual who is responsible for making strategic decisions based on the causal relationships. As another example, information regarding the directed graph may be recorded in a storage medium in anticipation of future recall. This information may be useful to individuals who are interested in better understanding the causal relationships between different variables, for example, to improve fully- or semi-automated processes concerning engagement, outreach, etc.

Each of these three phases is further described below. As those skilled in the art will recognize, the multi-phase approach described herein addresses a key technical problem of conventional approaches to determining causal relationships by establishing dependency before discretizing the underlying data.

Although not required, implementations are described in the context of computer-executable instructions, such as an algorithm that calls routines and is executed by a computing device, for convenience. The term "computing device," as used herein, may be used interchangeably with computer servers, personal computers, mobile phones, and the like. As an example, a set of algorithms designed to implement the multi-phase hybrid approach to discretization described above may be executed by an intelligence platform. The intelligence platform could be embodied using software that is executable by a computing device, or the intelligence platform could be embodied using hardware and/or firmware that is implementable in a computing device.

Aspects of the technology, such as certain tasks, functions, or modules, may by described as being performed exclusively or primarily on a single computing device. However, some embodiments are practiced in distributed environments where tasks/functions/modules are shared among multiple computing devices that are linked through a network. As an example, in a distributed environment, instances of a given module could be located in local and remote memory.

Terminology

The term "feature" refers to a characterizable attribute or behavior of a given individual. Examples of features include age, geographic location, type of computing device, and the like.

The term "mixed dataset" refers to a dataset that contains data related to at least one continuous variable and at least one discrete variable.

The term "continuous variable" refers to a variable that can take on an uncountable set of values. Examples of continuous variables include the number of products viewed by an individual and the average loading time for a webpage, as those variables can take on any value over the non-empty range of real numbers.

The term "discrete variable" refers to a variable for which there is a limited range of permitted values. Examples of discrete variables include whether an individual is a returning visitor to a website and whether an individual has registered for a service, as those variables are permitted to take on only two values (e.g., 1 for yes, 0 for no).

The term "graph" refers to a collection of nodes and edges that represent relationships. Nodes are the vertices that correspond to objects of interest (e.g., continuous and discrete variables), while edges are the connections between those objects.

The term "undirected graph" refers to a graph whose edges do not have a direction. Instead, the edges in an undirected graph may indicate a two-way relation, in that each edge can be traversed in both directions.

The term "directed graph" refers to a graph whose edges have a direction. These edges indicate a one-way relationship, in that each edge can only be traversed in a single direction.

The term "greedy search" refers to an algorithmic approach to problem solving in which the locally optimal choice is made at each step. Said another way, a greedy algorithm will make the optimal choice at each step as it attempts to find the overall optimal way to solve an entire problem.

Overview of Marketing Insight and Intelligence Platform

FIG. 1 illustrates a network environment 100 that includes a marketing insight and intelligence platform 102 (or simply "intelligence platform") that is able to execute instructions for discretizing mixed datasets while preserving the causal relationships between continuous and discrete variables. As further discussed below, the intelligence platform 102 may be comprised of a series of modules that are operable to construct an undirected graph that indicates dependency between variables of a mixed dataset, discretize the mixed dataset, and then identify a directed graph that reflects causal relationships among the variables. The term "module," as used here, refers broadly to software components, firmware components, and/or hardware components. Accordingly, aspects of the intelligence platform 102 could be implemented in software, firmware, and/or hardware.

As shown in FIG. 1, individuals can interface with the intelligence platform 102 via interfaces 104. One example of an intelligence platform 102 is the Adobe Experience Platform through which individuals manage customer experiences with marketers (e.g., businesses). The intelligence platform 102 may be responsible for creating the interfaces through which data related to customers can be viewed, edited, analyzed, and exported. Similarly, the intelligence platform 102 may be responsible for creating the interfaces through which an individual can define marketing strategies, select cohorts of customers for targeting, specify preferences, etc.

In some embodiments, the mixed data related to one or more customers that is to be examined is created by the intelligence platform 102. In other embodiments, the mixed data is obtained by the intelligence platform 102. For example, the intelligence platform 102 may be configured to retrieve mixed data related to customer(s) from a network-accessible storage on a periodic basis.

As noted above, the intelligence platform 102 may reside in a network environment 100. Thus, the intelligence platform 102 may be connected to one or more networks 106a-b. The network(s) 106a-b can include personal area networks (PANs), local area networks (LANs), wide area networks (WANs), metropolitan area networks (MANs), cellular networks, the Internet, etc. Additionally or alternatively, the intelligence platform 102 can be communicatively connected to computing device(s) over a short-range wireless connectivity technology, such as Bluetooth®, Near Field Communication (NFC), Wi-Fi® Direct (also referred to as "Wi-Fi P2P"), and the like.

The interfaces 104 may be accessible via a web browser, desktop application, mobile application, or over-the-top (OTT) application. Accordingly, the interfaces 104 may be viewed on a personal computer, tablet computer, mobile phone, game console, music player, wearable electronic device (e.g., a watch or a fitness accessory), network-connected ("smart") electronic device, (e.g., a television or a home assistant device), virtual/augmented reality system (e.g., a head-mounted display), or some other electronic device.

In some embodiments, at least some components of the intelligence platform 102 are hosted locally. That is, part of the intelligence platform 102 may reside on the computing device used to access one of the interfaces 104. For example, the intelligence platform 102 may be embodied as a desktop application executing on a personal computer. Note, however, that the desktop application may be communicatively connected to a network-accessible resource. Examples of network-accessible resources include private storage mediums (e.g., those maintained by enterprises or individuals), private cloud infrastructures, and public cloud infrastructures. The network-accessible resource may host other components of the intelligence platform 102, or the network-accessible resource may host content, such as mixed datasets, that can be used by the intelligence platform 102.

In other embodiments, the intelligence platform 102 is executed entirely by a cloud computing service operated by, for example, Amazon Web Services® (AWS), Google Cloud Platform™, or Microsoft Azure®. In such embodiments, the intelligence platform 102 may reside on a network-accessible server system 108 comprised of one or more computer servers. These computer server(s) can include different types of data (e.g., data related to continuous variables, data related to discrete variables, processing operations, segmentation algorithms), customer information (e.g., profiles that specify customer features), and other assets.

Figure 2:
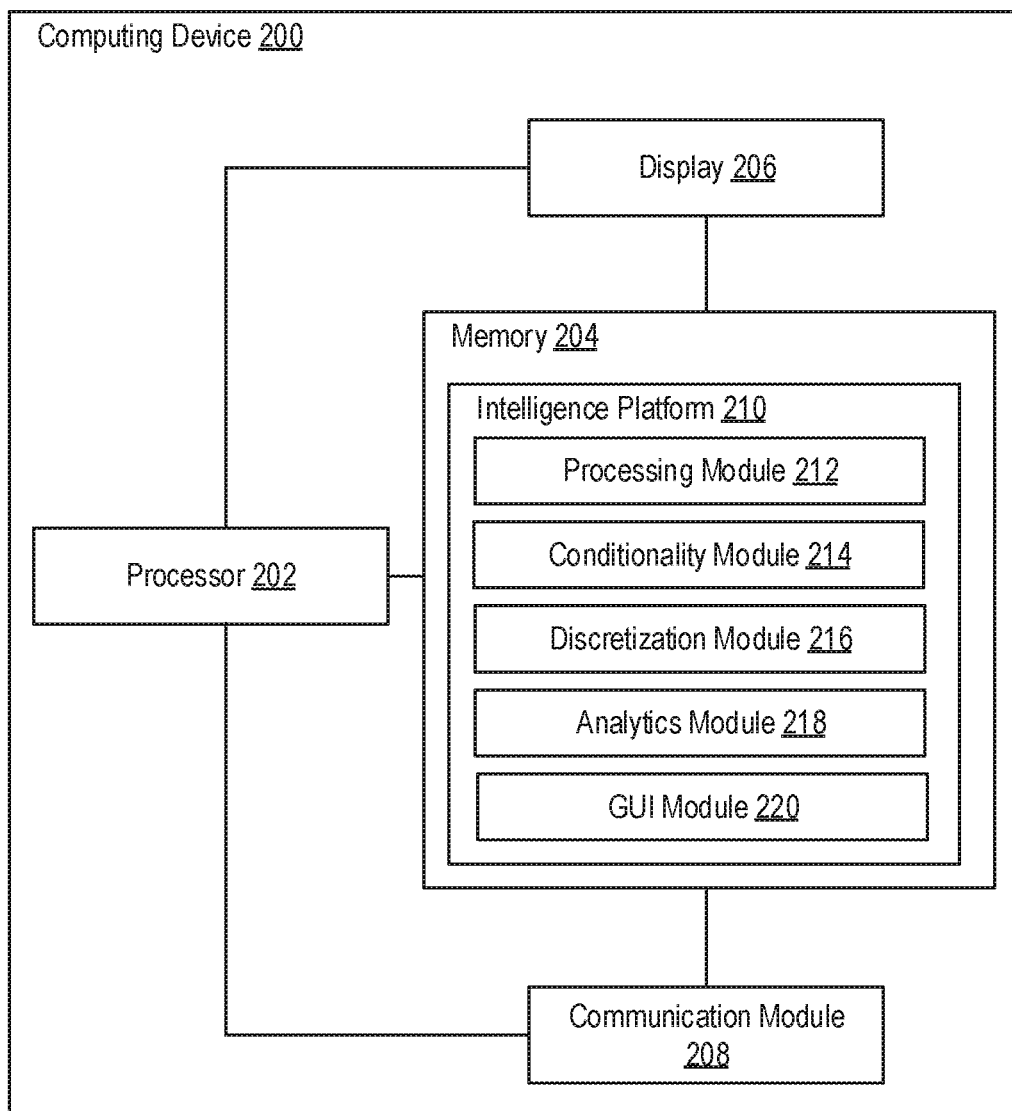
FIG. 2 illustrates an example of a computing device that is capable of implementing the multi-phase approach to causal determination described herein.

FIG. 2 illustrates an example of a computing device 200 that is capable of implementing the multi-phase approach to causal determination described herein. Note that the components shown in FIG. 2 are merely illustrative. Components that are well known are not shown for simplicity. Referring to FIG. 2, the computing device 200 may include a processor 202, memory 204, display 206, and communication module 208.

The communication module 208 may be, for example, wireless communication circuitry designed to establish wireless communication channels with other computing devices. Examples of wireless communication circuitry include integrated circuits (also referred to as "chips") configured for Bluetooth, Wi-Fi, NFC, and the like. The processor 202 can have generic characteristics similar to general-purpose processors, or the processor 202 may be an application-specific integrated circuit (ASIC) that provides control functions to the computing device 200. As shown in FIG. 2, the processor 202 can be coupled to all components of the computing device 200, either directly or indirectly, for communication purposes.

The memory 204 may be comprised of any suitable type of storage medium, such as static random-access memory (SRAM), dynamic random-access memory (DRAM), electrically erasable programmable read-only memory (EEPROM), flash memory, or registers. In addition to storing instructions that can be executed by the processor 202, the memory 204 can also store data generated by the processor 202 (e.g., when executing the modules of the intelligence platform 210). Note that the memory 204 is merely an abstract representation of a storage environment. The memory 204 could be comprised of actual memory chips or modules.

For convenience, the intelligence platform 210 may be referred to as a computer program that resides within the memory 204. However, the intelligence platform 210 could be comprised of software, firmware, and/or hardware components implemented in, or accessible to, the computing device 200. In accordance with embodiments described herein, the intelligence platform 210 may include a processing module 212, conditionality module 214, discretization module 216, analytics module 218, and graphical user interface (GUI) module 220. These modules can be an integral part of the intelligence platform 210. Alternatively, these modules can be logically separate from the intelligence platform 210 but operate "alongside" it. Together, these modules enable the intelligence platform 210 to implement a scalable algorithm that is able to determine causal relationships through data-driven discretization of continuous and discrete variables. As further discussed below, the conditionality module 214, discretization module 216, and analytics module 218 may execute separate routines that represent different parts of the scalable algorithm.

Initially, the intelligence platform 210 can obtain a mixed dataset that contains data related to multiple variables. For simplicity, the multiple variables may be described as including at least one continuous variable and at least one discrete variable. However, those skilled in the art will recognize that a mixed dataset could include any number of continuous and discrete variables. In some embodiments, each of the multiple variables is associated with a different customer-related feature. As mentioned above, the mixed dataset could be generated by the intelligence platform 210, or the mixed dataset could be acquired by the intelligence platform 210. For example, the intelligence platform 210 may acquire the mixed dataset from the memory 204 or a remote memory via the communication module 208.

The processing module 212 may be responsible for processing the mixed dataset obtained by the intelligence platform 210 into a format suitable for the other modules. Said another way, the processing module 212 may be responsible for ensuring that the data related to the continuous variable(s) and discrete variable(s) is made accessible to the other modules. For example, the processing module 212 may apply a filter to a portion of the mixed dataset (e.g., the data related to a single variable). As another example, the processing module 212 may examine metadata associated with each variable to ensure that all of the data included in a mixed dataset is related to a single customer. This may be done in embodiments where the intelligence platform 210 obtains data related to different variables, either simultaneously or sequentially, and then forms the mixed dataset from those data.

The conditionality module 214 may be responsible for producing an undirected graph that indicates dependency among the multiple variables. This can be accomplished with the help of statistical dependency tests between different pairs of variables conditioned on other sets of variables. Thus, the conditionality module 214 may compute pairwise dependency between the multiple variables in an exhaustive manner so that for each pair of variables, a metric indicative of dependency is computed. The conditionality module 214 can identify, based on the dependency metrics, each pair of variables that is not conditionally independent of one another. The conditionality module 214 can then generate the undirected graph by adding, to a disconnected graph containing multiple nodes that are representative of the multiple variables, an edge between each pair of nodes that corresponds to an identified pair of variables. Such an approach allows the conditionality module 214 to determine dependency through analysis of the mixed dataset.

After the conditionality module 214 has generated the undirected graph, the discretization module 216 can discretize the continuous variables in the mixed dataset to produce a fully discretized dataset. As further discussed below, the discretization module 216 may be responsible for determining the proper policy for discretizing each continuous variable in some embodiments.

Meanwhile, the analytics module 218 may be responsible for identifying an appropriate directed graph to represent causal relationships of the multiple variables in the mixed dataset. One example of a directed graph is a directed acyclic graph (DAG), which is a directed graph with no directed cycles. As further discussed below, the directed graph may be selected from amongst multiple candidate directed graphs (or simply "candidates") based on (i) how well each candidate fits the fully discretized dataset and (ii) whether each candidate conflicts with the undirected graph. To ensure that dependence is properly captured, the edges absent in the undirected graph may be forbidden in the directed graph.

In some embodiments, the analytics module 218 uses the directed graph to perform analytics on the causal relationships among the multiple variables. For example, the analytics module 218 may perform, based on the directed graph, analytics to identify an additional piece of information (e.g., a recommended course of action) that shares, or depends on, the causal relationships among the multiple variables. Additionally or alternatively, the analytics module 218 may generate a record of the directed graph so as to enable an individual to make a decision based on the causal relationships among the multiple variables. The analytics module 218 may store information regarding the directed graph (e.g., specifying the related variables) in a data structure that is representative of a profile, or the analytics module 218 may store the directed graph itself in a data structure that is representative of a profile. The profile may be associated with the entity that is associated with the mixed dataset. For example, if the mixed dataset contains information regarding visitors to a website, then the entity may be the business associated with the website.

Note that the record could be used in a variety of contexts. For example, a visual representation of the directed graph could be posted to an interface by the GUI module 220 so as to visually convey the causal relationships among the multiple variables. The visual representation may be viewed by an individual who is responsible for making strategic decisions based on the causal relationships. For instance, the individual may be responsible for determining which customers to target as part of a marketing campaign, determining the likelihood of success in targeting customers having a certain feature, etc. As another example, the directed graph could be provided, as input, by the analytics module 218 to a computer-implemented model that is designed to output, for example, information intended to facilitate decision making. The term "computer-implemented model" may refer to a set of algorithms designed to produce an output given an input. Assume, for example, that the mixed dataset obtained by the intelligence platform 210 contains information regarding the features of visitors to a website. In such a scenario, the analytics module 218 may provide the directed graph to a computer-implemented model designed to identify the visitors (e.g., based on one or more features) for whom targeted advertising or outreach may be most successful in terms of resulting in completed transactions, repeat visits, etc.

Other modules could also be included as part of the intelligence platform 210. For instance, a GUI module 220 may be responsible for generating the interfaces through which an individual can interact with the intelligence platform 210, as well as view outputs produced by the aforementioned modules. As an example, the directed graph identified by the analytics module 218 may be posted by the GUI module 220 to an interface presented on the display 206. As another example, the mixed dataset obtained by the intelligence platform 210 may be posted by the GUI module 220 to an interface presented on the display 206.

Automated Approach to Causal Determination on Mixed Datasets

As mentioned above, an intelligence platform may employ a multi-phase hybrid approach designed to handle mixed datasets. This multi-phase hybrid approach may be embodied in a scalable algorithm that is able to determine causal relationships in data containing continuous and discrete variables. The algorithm may be comprised of several routines. Each of these routines corresponds to a "phase" of the multi-phase hybrid approach and is discussed in greater detail below.

A. Obtaining Undirected Graph

In the first phase, the intelligence platform aims to learn an undirected graph indicative of dependency among the variables in a mixed dataset. This can be accomplished with the help of statistical dependency tests between pairs of variables that are conditioned on other sets of variables. As an example, the intelligence platform may perform a Fast Conditional Independence Test (FCIT) to discover which variables are conditionally independent of one another. Note, however, that any statistical dependency test able to identify the set of conditionally independent variables for a given variable could be employed by the intelligence platform. FCIT is desirable because it allows conditional independence to be determined between different data types.

Figure 3A:
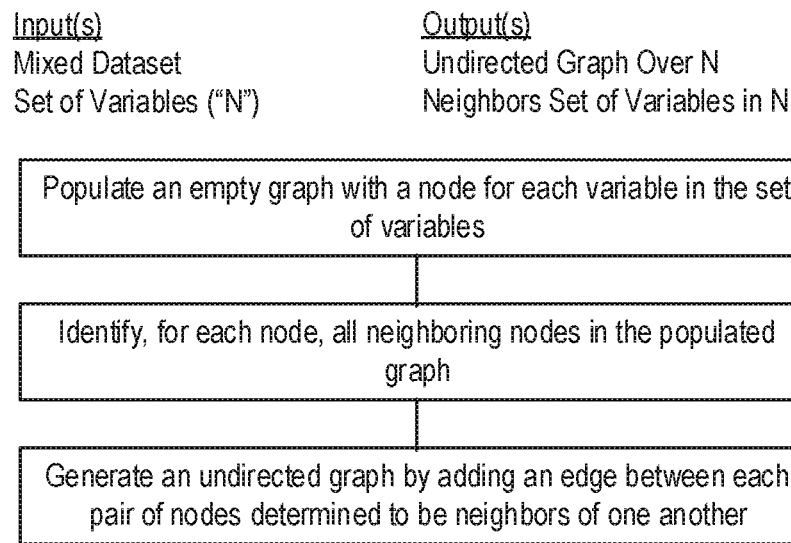
FIG. 3A includes an example of an algorithm that may be used to generate a skeletal frame (also referred to as a "skeleton") of connected nodes.

In FIG. 3A, an example of an algorithm that may be used to generate a skeletal frame (also referred to as a "skeleton") of connected nodes is shown. As further discussed below, the skeleton is one example of an undirected graph that may be produced by the intelligence platform. The intelligence platform provides two items as input, (1) the mixed dataset and (2) the set of variables. As mentioned above, the set of variables includes at least one continuous variable and at least one discrete variable. As can be seen in FIG. 3A, the algorithm begins with a completely disconnected graph and then adds edges between nodes corresponding to variables that are identified as not conditionally independent of one another. The algorithm then returns two items as output, (1) the skeleton of connected nodes that is representative of an undirected graph and (2) the neighbor set of variables. The neighbor set of variables may specify, for each variable in the set, the other variables that are neighbors due to being interconnected in the undirected graph.

As mentioned above, the undirected graph will include multiple nodes, some of which are connected via edges. Each node in the undirected graph may correspond to a continuous or discrete variable in the mixed dataset. For the purpose of illustration, the term "continuous node" may be used to describe a continuous variable in a mixed dataset that is represented by a node in the undirected graph. Similarly, the term "discrete node" may be used to describe a discrete variable in a mixed dataset that is represented by a node in the undirected graph.

B. Data-Driven Discretization

Figure 3B:
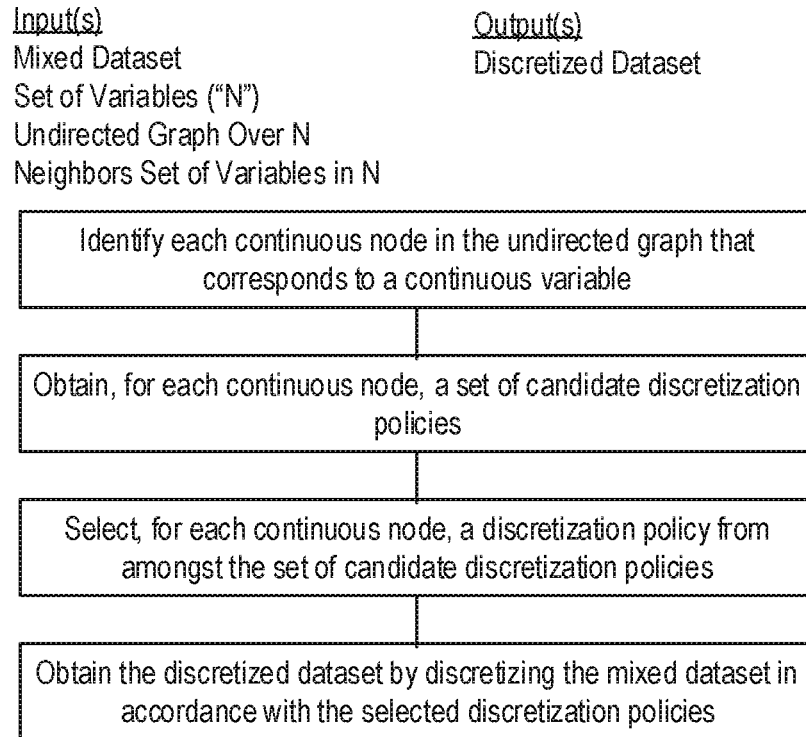
FIG. 3B includes an example of an algorithm that may be used to discretize the continuous variables in a mixed dataset.

In the second phase, the continuous variables in the mixed dataset are discretized by the intelligence platform using, for example, the algorithm shown in FIG. 3B. As can be seen in FIG. 3B, this algorithm iterates by determining, for each continuous node, a set of candidate discretization policies and then selecting the best among them. Each candidate discretization policy is obtained by selecting a discrete node (also referred to as a "target node") that neighbors the continuous node and then using the discrete node as a target variable in a discretization algorithm. The discretization algorithm may be, for example, a single-variable supervised discretization algorithm such as Ameva. To avoid unnecessary computation, the choice of target variables may be restricted to just neighboring nodes. The values of the discrete node can be used as the supervised class labels by the discretization algorithm. To discretize the continuous node given a discrete node, the intelligence platform may employ a discretization algorithm with a modification to handle multi-label datasets.

The decision on the best discretization policy for a continuous node is made by determining a new set of neighbors of the continuous node with the data as discretized in accordance with each candidate discretization policy and then selecting whichever candidate discretization policy resulted in an output that is closest to the original set of neighbors. This may be accomplished using the same algorithm as was used in the first phase. The "closeness" of the new set of neighbors and original set of neighbors may be established in terms of Structural Hamming Distance (SHD). Such an approach ensures that the actual dependency, as represented in the undirected graph, is maintained while discretizing the mixed dataset.

The continuous nodes in the undirected graph (and, more specifically, the continuous variables corresponding to those nodes) can be discretized in the decreasing ratio of its number of discrete neighboring nodes. These ratios may be updated each time that a continuous node is discretized. This ordering ensures that continuous nodes connected to an originally discrete node are discretized first. Finally, the remaining continuous nodes that do not have any discrete neighboring nodes can be discretized using all other nodes in the undirected graph as target nodes for candidate discretization policies.

C. Score-and-Search on Discretized Data

Figures 3C, 4:
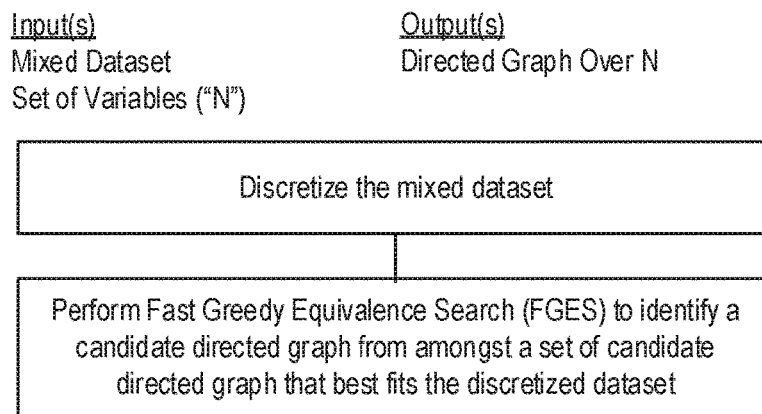
FIG. 3C includes an example of an algorithm that may be used to identify an appropriate directed graph for a mixed dataset from amongst multiple candidate directed graphs.
FIG. 4 includes the results of experiments conducted on four synthetic datasets, wherein the multi-phase approach is compared to the three baselines.

In the third phase, the intelligence platform can perform a greedy search over the space of all candidate directed graphs using a scoring function that evaluates how well each candidate directed graph fits the discretized dataset. The edges absent in the undirected graph returned in the first phase are also forbidden in the final directed graph. Various search-and-score algorithms could be employed by the intelligence platform in the third phase, so long as it works on discretized data and allows forbidden edges as input. FIG. 3C includes one example of a search- and score algorithm that could be used by the intelligence platform. In this example, the intelligence platform uses the Fast Greedy Equivalence Search (FGES) along with scores produced by the BDeu scoring function on the discretized dataset produced in the second phase. The BDeu scoring function used in combination with the FGES aims at maximizing the posterior probability of the directed graph given the discretized dataset, while assuming a uniform prior over possible directed graphs.

FGES is an optimized and parallelized version of an algorithm called the Greedy Equivalence Search (GES). GES is a Bayesian algorithm that heuristically searches the space of causal Bayesian networks and returns the network with the highest score. In particular, GES starts its search with an empty graph. It then performs a forward-stepping search in which edges are added between nodes in order to increase the Bayesian score. This process continues until no single edge addition increases the Bayesian score. Then, it performs a backward-stepping search that removes edges until no single edge removal can increase the Bayesian score.

D. Experimental Results

The approach to causal determination described above was evaluated against three popular causal determination algorithms: (1) the constraint-based PC algorithm described by Peter Spirtes et al, in "Causation, Prediction, and Search," *MIT Press*, 2000; (2) the hybrid max-min hill-climbing (MMHC) algorithm described by Ioannis Tsamardinos et al. in "The Max-Min Hill-Climbing Bayesian Network Structure Learning Algorithm," *Machine Learning*, 65(1):31-78, 2006; and (3) the score-based FGES algorithm described by Joseph Ramsey et al. in "A Million Variables and More: The Fast Greedy Equivalence Search Algorithm for Learning High-Dimensional Graphical Causal Models, with an Application to Functional Magnetic Resonance Images," *International Journal of Data Science and Analytics*, 3(2):121-129, 2017.

Extensive experimentation was performed to validate the hybrid approach described herein on four synthetic datasets simulating realized mixed-data scenarios of varying scales. A principled approach was employed to randomly generate the four synthetic datasets of different sizes that contain mixed variables. To generate a synthetic dataset, a random graph was sampled from the set of all directed graphs with the specified number of nodes and graph density (e.g., with an average number of edges per node of approximately 3). Each node in the random graph was assigned to be categorical (i.e., discrete) or continuous with equal probability, and the number of categories of each categorical node was chosen randomly in the range of 3-5. This Bayesian network was used as the ground truth to evaluate to output of each algorithm.

Next, the Bayesian network was used to generate 50,000 data samples for the corresponding synthetic dataset by parsing the network in the topological order of its nodes. Each continuous variable was generated by first partitioning on the distinct values of its categorical parents and then sampling, for each partition, from a linear Gaussian model of its continuous parents. The coefficients of the linear Gaussian model were randomly parameterized. Meanwhile, each categorical variable was generated by sampling from a randomly parameterized multinomial distribution of its categorical and continuous parents. The four synthetic datasets ultimately had the following sizes: small with 10 nodes and 13 edges; medium with 30 nodes and 51 edges; large with 50 nodes and 70 edges; and massive with 70 nodes and 103 edges.

Below, a detailed explanation of the complete experimental setup is provided along with analysis of the evaluation metrics. As mentioned above, three popular causal determination algorithms were used as baselines for comparison of the multi-phase approach described here. These baselines were tried using two strategies—with and without discretization of continuous variables.

In the case with discretization, three different univariate discretization techniques were employed: (1) uniform binning in which the data was divided into bins of equal width; (2) quantile-based binning in which the data was divided into bins with equal number of elements in each bin; and (3) k-means binning in which the data was partitioned in k clusters such that each observation belongs to the cluster with the nearest mean, thereby serving as a prototype of the cluster. Note that the aforementioned baselines perform discretization during a pre-processing stage and then employ the constraint-based dependency determination phase (or simply "constraint-based phase") and search-and-score phase.

In the constraint-based phase, a chi-squared test was used as the conditional independence test to determine the undirected graph because it performs best with discrete data. Since the PC algorithm is purely constraint based, it does not have a search-and-score phase. For MMHC and FGES, two different scores—specifically BDeu and Sem-BIC—are used in the search-and-score phase. Both algorithms were found to perform better with BDeu. Because the multi-phase approach described herein does not involve parameter tuning, the discretization hyper-parameters were not tuned for any of the baselines to have a fair initial comparison. Moreover, any such tuning is largely impossible in a real setting where there is no ground truth to compare with. Therefore, the continuous columns were discretized using an educated choice of uniform binning with 8 bins by analyzing the data statistically. Lastly, these choices were tuned on a validation dataset so that the optical values for comparing the best performance of the baselines with the multi-phase approach could be selected.

In the case without discretization, the baselines were directly tested on the mixed dataset using the FCIT and Deep Learning Conditional Independence Test (DLCIT) in the constraint-based phase and the conditional Gaussian score in the search-and-score phase. All of the algorithms performed quite poorly in comparison to their performance with discretization. Some algorithms took too much time to complete, while other algorithms failed drastically in terms of the evaluation metrics. For this reason, only the results of the comparison with the baselines with discretization are provided below.

For all of the conditional independence tests in the baselines, the significance level was fixed at 0.05 as mentioned in the respective literatures. For the multi-phase approach, the significance level for conditional independence tests was fixed at 0.1 to preserve more dependencies.

For comparison, 8 evaluation metrics were used to determine the correctness of the directed graph estimated by each of the algorithms with respect to the ground truth derived from the original graph. These evaluation metrics fall into three categories: (1) adjacency metrics; (2) arrowhead metrics; and (3) Hamming distance metrics.

Adjacency metrics are a measure of how accurately an algorithm identifies the adjacent pairs of nodes in the output graph. Said another way, adjacency metrics indicate how accurately the nodes that are directly connected to one another were identified. It does not consider the direction of an edge in determining whether the edge was correctly identified. Examples of adjacency metrics include:

Adjacency Precision (AP): The ratio of the number of correctly predicted edges to the number of total predicted edges in the output graph irrespective of direction, expressed as a percentage;

Adjacency Recall (AR): The ratio of number of correctly predicted edges in the output graph to the number of total edges in the true graph, expressed as a percentage; and Adjacency F1 Score (AF): The harmonic mean of AP and AR, which measures the level of performance on the two metrics jointly.

Arrowhead metrics are a measure of how accurately an algorithm determines the directions of the already identified undirected edges and then orients them. In other words, these metrics evaluate how well an algorithm estimates the final data-generating process given the set of adjacent nodes. Examples of arrowhead metrics include:

Arrowhead Precision (AHP): The ratio of the number of correctly predicted directed edges to the number of total predicted directed edges in the output graph, expressed as a percentage;

Arrowhead Recall (AHR): The ratio of the number of correctly predicted directed edges to the number of correctly predicted adjacencies in the output graph, expressed as a percentage; and Arrowhead F1 Score (AHF): The harmonic mean of AHP and AHR, which measures the level of performance on the two metrics jointly.

Hamming metrics, meanwhile, are a measure of the Hamming distance between the estimated graph and the true graph that serves as the ground truth. These metrics essentially quantify the number of mistakes in the identification of the edges, including their directions, thereby evaluating the estimation of both adjacencies and arrowheads. Examples of Hamming metrics include:

Structural Hamming Distance (SHD): The number of edge insertions, edge deletions, and edge flips required to transform the output graph into the true graph; and SHD Between CPDAGs: The SHD between the Completed Partially Directed Acyclic Graphs (CPDAGs) of the output graph and true graph.

FIG. 4 includes the results of the experiments conducted on the synthetic datasets. In particular, the multi-phase approach is compared against the three baselines—PC, MMHC, and FGES—in the 8 evaluation metrics described above. Note that for the baselines, the data was first discretized using an educated choice of uniform binning with 8 bins. For the multi-phase approach, no such selection was required. One of the first observations is that FGES is the best-performing baseline as the size of the synthetic dataset increases from small to massive. The only metric where PC or MMHC has an edge over FGES is AP, though each suffers drastically in AR, thereby still resulting in a poorer AF than FGES. In terms of the F1 scores and distance metrics, FGES is the clear winner among the baselines.

Overall, the evaluation metrics of FGES are much more comparable to the multi-phase approach than the other baselines. While FGES yields good results on all synthetic datasets, the multi-phase approach outperforms FGES by a fair margin. In the adjacency metrics, the multi-phase approach produces the best AR and AF on all synthetic datasets with FGES a close second. PC and MMHC are slightly better than the multi-phase approach in terms of AP, but the corresponding performance in AR is poor. Similarly, in the arrowhead metrics, the multi-phase approach performs the best followed by FGES, Lastly, the multi-phase approach beats all baselines by a significant margin in terms of the distance metrics, which evaluate the overall output of the algorithms.

E. Comparison with Tuned Baselines

There are several limitations of using the aforementioned baselines in real-world scenarios. One of these limitations is that to achieve the best possible results, appropriate discretization hyper-parameters must be selected. But tuning the discretization hyper-parameters may be difficult, if not impossible, in many real-world scenarios.

Some limitations of using the best-performing baseline, FGES, in a real-world scenario are highlighted below by illustrating its performance on a separate validation set of the synthetic datasets. FIG. 5 includes a comparison of different univariate discretization strategies with FGES while keeping the number of discretization bins fixed at 5. As can be seen in FIG. 5, there is no clear winner in terms of discretization strategy. Quantile and k-means perform identically and overall better than uniform on large and massive datasets, with the difference being greater on the large dataset than the massive dataset. On the small dataset, uniform discretization yields the best results. K-means discretization performs best on the medium dataset with uniform discretization a close second place. On average, k-means appears to be the best discretization strategy across all of the datasets, and thus was used for comparing FGES with the multi-phase approach described herein.

Another point that should be noted is that the performance of FGES varied with the choice of discretization strategy, and the variations were quite large in some cases, such as SHD and SHDC for the large dataset. Therefore, the choice of discretization strategy is an important decision when using FGES, even though that decision is not an easy one to make by an individual analyst responsible for analyzing the underlying data.

Figure 6:
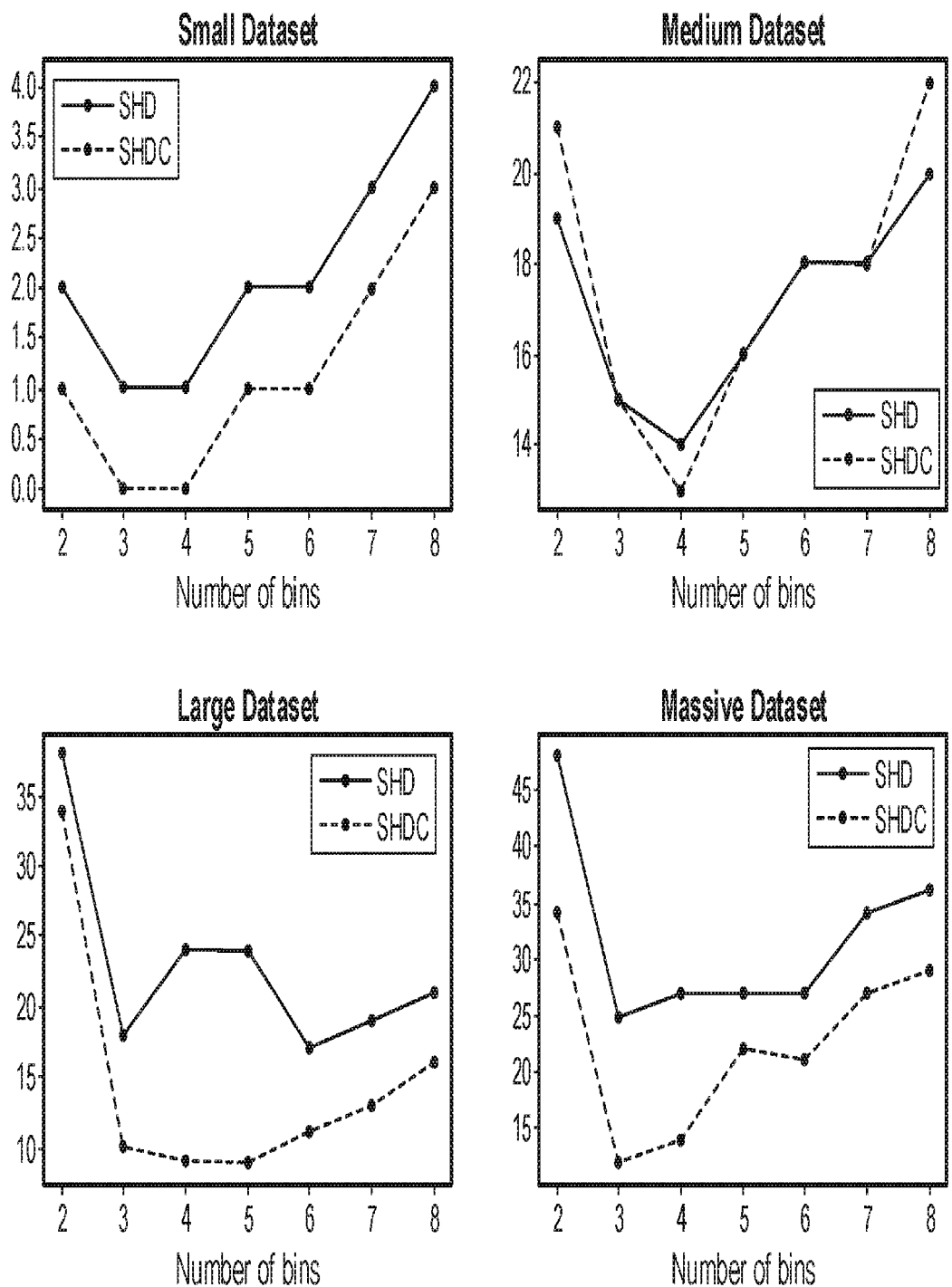
FIG. 6 illustrates the variation in performance of FGES as the number of discretization bins is altered.

Then, the performance of FGES was studied with varying numbers of bins when employing k-means discretization. The number of bins varied from 2 to 8, and the corresponding variation in SHD and SHDC is shown in FIG. 6. More specifically, FIG. 6 illustrates the variation in performance of FGES as the number of discretization bins is altered. The optimal number of bins was determined to be 4 in the case of small and medium datasets, 6 in the case of large datasets, and 3 in the case of massive datasets. These values were used to report the best possible results of FGES on the test data with k-means discretization.

At a high level, the plots in FIG. 6 show that the results depend heavily on the number of discretization bins, in that the performance of the algorithm degrades drastically with even a slightly non-optimal selection for number of discretization bins. Moreover, performance can be expected to be even poorer when one does not have an approximate estimate of the optimal number of discretization bins. Unlikely the synthetic dataset used here, it is difficult to have even a decent estimate for the appropriate number of discretization bins a priori. This is a significant drawback of using data-independent discretization strategies in real-world situations.

To summarize, FIGS. 5-6 show that the results of FGES depend heavily on the number of discretization bins and mildly on the discretization strategy. While the simulated nature of the synthetic datasets in the experiences allows the choices for number of discretization bins to be narrows, this would not be true for practical scenarios. Since causal determination is an unsupervised problem, one cannot tune parameters or perform model selection on a validation dataset due to the lack of any ground truth. The multi-phase approach described herein obviates this issue by being parameter free.

FIG. 7 shows the comparison of the multi-phase approach with the three baselines along 8 evaluation metrics after fine tuning. Note that the results corresponding to the baselines are the best possible results tuned on the validation dataset mentioned above. For the multi-phase approach, no such tuning was required.

Again, FGES easily outperforms the other baselines with PC and MMHC lagging far behind. After tuning, the results of FGES are comparable to those produced via the multi-phase approach. While FGES is slightly better in the adjacency metrics, the multi-phase approach beats FGES by similar margins on the arrowhead metrics. The two algorithms have very similar distance metrics with each approach outperforming the other in some cases.

F. Use Case

As part of the experiment, the multi-phase approach was employed on a mixed dataset containing information regarding activities performed by visitors to a website and features of those visitors. The mixed dataset contained information regarding all new visitors of the website over a predetermined interval of time. Each row of the mixed dataset corresponding to a unique visitor, while each column was associated with a feature as shown in Table II. As can be seen in Table II, some features are representative of discrete variables while other features are representative of continuous variables.

TABLE II

Visitor features included in the mixed dataset.

| Customer Feature | Data Type |
|---|---|
| Most Used Device Type | Categorical |
| First Device Type | Categorical |
| Returning Customer | Boolean |
| Most Frequent Channel | Categorical |
| Number of Searches | Numerical |
| Number of Product Views | Numerical |
| Last Self-Help Product Used | Categorical |
| Most Viewed Self-Help Product Topic | Categorical |
| Number of Videos Viewed | Numerical |
| Has Signed Up? | Boolean |
| Number of Search Clicks | Numerical |
| Number of Videos Completed | Numerical |
| Average Page Load Time | Numerical |
| Number of Internal Searches | Numerical |

As can be seen from Table II, the mixed dataset contains categorical, Boolean, and numerical features. As such, the multi-phase approach can be employed to learn the Bayesian network that captures causal relationships in the mixed dataset. At a high level, a Bayesian network is a probabilistic model formed by a structure and characterized by parameters. The structure of a Bayesian network is a directed graph, such as a DAG, while its parameters are representative of conditional probability distributions associated with variables in the model. Ideally, this directed graph should coincide with the undirected graph. But this has proven difficult using conventional approaches to establishing causal dependence for mixed datasets, at least in part because those approaches involve discretizing the mixed datasets before determining causal dependence.

Figure 8A:
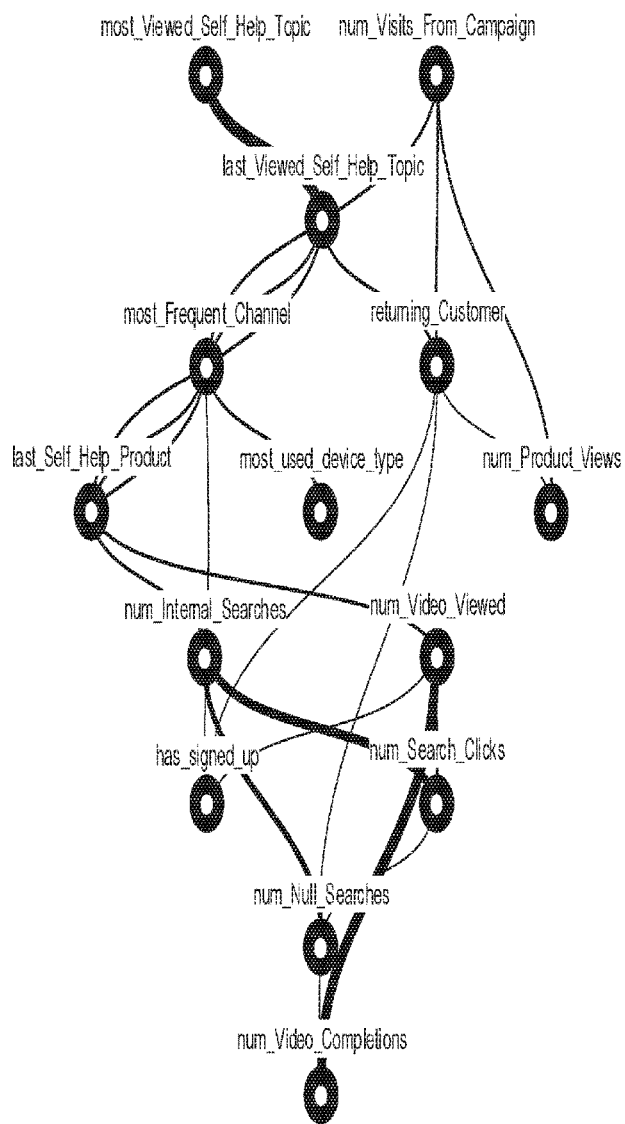
FIG. 8A includes an example of a Bayesian network learned by a marketing insight and intelligence platform for a mixed dataset.
Figure 8B:
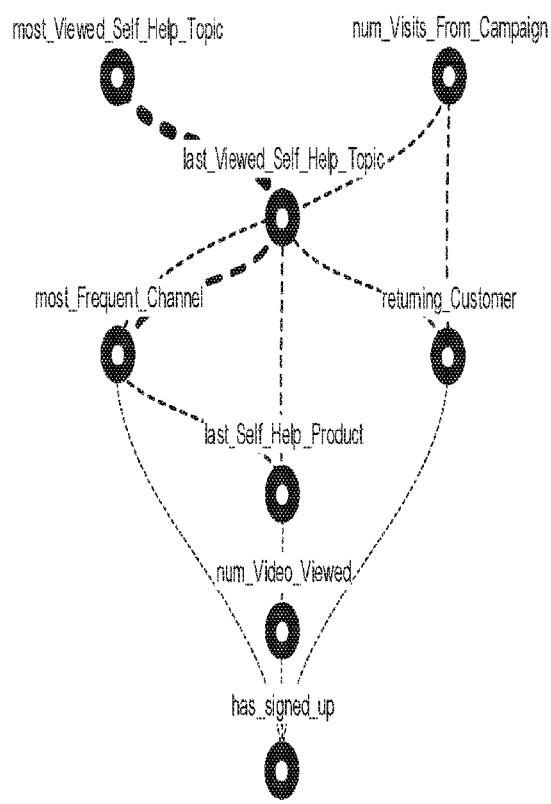
FIG. 8B depicts the subnetwork containing all directed paths to a given feature of interest included in the Bayesian network of FIG. 8A.

Upon closer observation, those skilled in the art will recognize that some of the edges should be blacklisted (i.e., prohibited from being part of the Bayesian network). For example, there should not be an edge between the second (i.e., First Device Type) and tenth (i.e., Has Signed Up?) features. The algorithm was augmented to make sure that such edges were not part of the output. The learned Bayesian network is shown in FIG. 8A. All edges have directions going downwards, and the thickness of an edge indicates degree of correlation between the nodes. Assume, for example, that the main key performance indicator (KPI) of interest in the mixed dataset if the Boolean variable indicating whether the visitor signed up. The subnetwork containing all directed paths to this feature is shown in FIG. 8B.

Methodologies for Causal Determination

Figure 9:
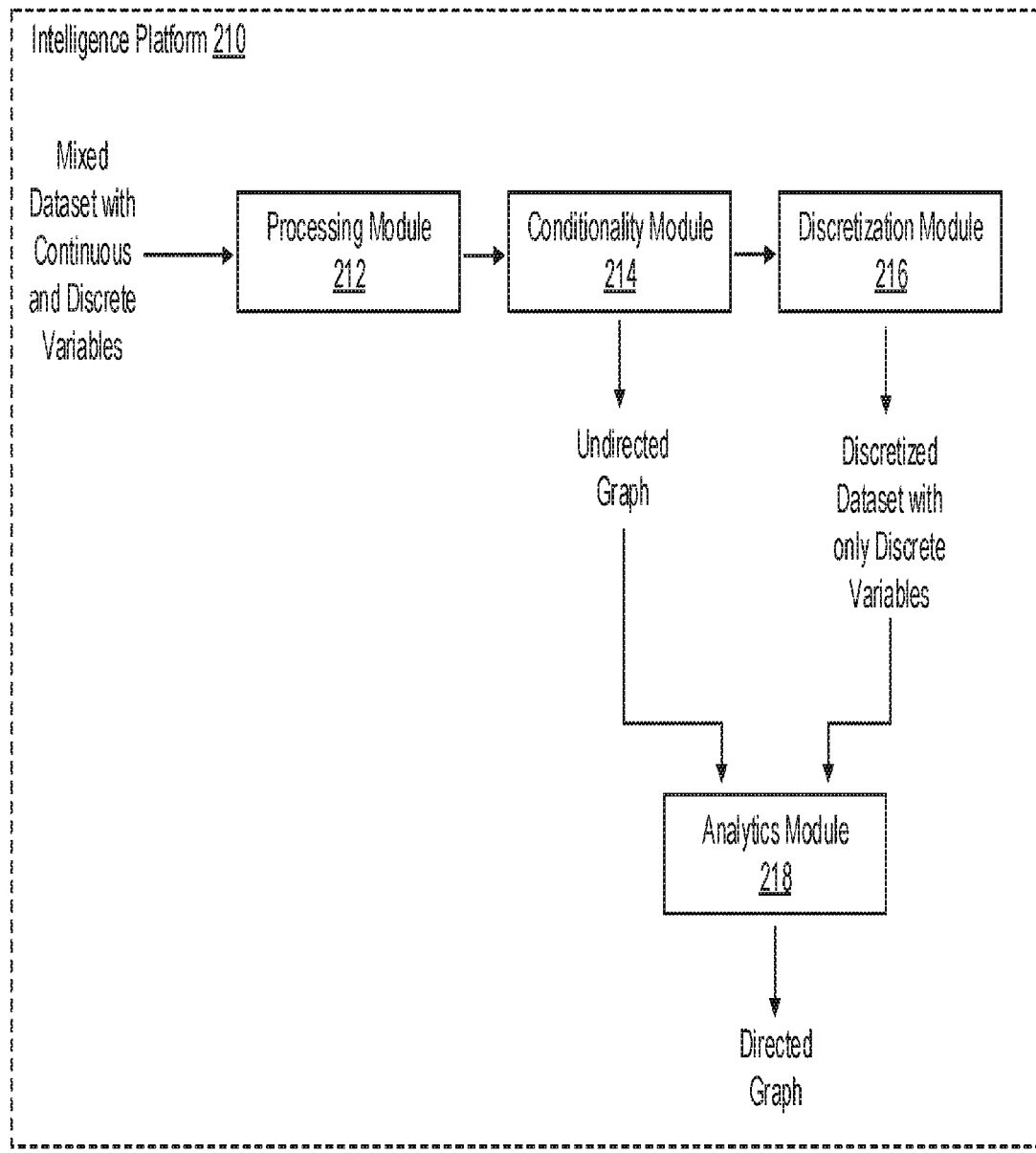
FIG. 9 includes a high-level illustration of a process for determining causal dependence among variables in a mixed dataset.

FIG. 9 includes a high-level illustration of a process for determining causal dependence among variables in a mixed dataset. For convenience, reference is made to the numerals used in FIG. 2 for the various modules of an intelligence platform 210.

Initially, a mixed dataset that contains data related to multiple variables is obtained by a processing module 212. As mentioned above, the term "mixed dataset," as used here, refers to a dataset that contains data related to at least one continuous variable and at least one discrete variable. In some embodiments, the processing module 212 is responsible for retrieving and/or compiling the various data that are contained in the mixed dataset. For example, the processing module 212 may obtain data related to a continuous variable and data related to a discrete variable and then create a mixed dataset that includes those data. Alternatively, the processing module 212 may simply be responsible for ensuring that the mixed dataset obtained by the intelligence platform 210 is in a format suitable for the other modules. The processing module 212 may not be needed if, for example, the mixed dataset is suitable for examination by the conditionality module 214 upon being obtained.

The conditionality module 214 can produce an undirected graph that indicates dependency among the multiple variables. For example, the conditionality module 214 may compute pairwise dependency between the multiple variables so that for each pair of variables, a metric indicative of the degree of dependency is computed. Using those metrics, the conditionality module can identify each pair of variables that is not conditionally independent of one another and then generate the undirected graph. The undirected graph may be generated by adding, to a disconnected graph containing multiple nodes that are representative of the multiple variables, an edge between each pair of nodes that corresponds to an identified pair of variables.

Thereafter, the mixed dataset can be provided to the discretization module 216 for discretization. As mentioned above, the mixed dataset will include data that is related to continuous variable(s) and data that is related to discrete variable(s). The discretization module 216 is responsible for discretizing the data related to the continuous variable(s) to produce a fully discretized dataset from the mixed dataset.

The analytics module 218 can identify a directed graph that reflects causal relationships among the multiple variable based on multiple inputs including (i) the undirected graph produced by the conditionality module and (ii) the discretized dataset produced by the discretization module 216. More specifically, the analytics module 218 may perform a greedy search of multiple candidate directed graphs using a scoring function that evaluates how well each candidate directed graph fits the discretized dataset and then select whichever candidate directed graph has the highest score. For example, the analytics module 218 may be configured to apply a Bayesian algorithm that is designed to heuristically search the multiple candidate directed graphs and return whichever candidate directed graph most closely matches the discretized dataset, given the forbidden edges. The directed graph may be, for example, a DAG with the multiple variables as vertices.

As discussed above, edges that are absent in the undirected graph produced by the conditionality module 214 are forbidden in the directed graph identified by the analytics module 218. Such an approach ensures that the directed graph properly reflects causal dependency between the multiple variables since dependency is established before the underlying data is discretized.

Figure 10:
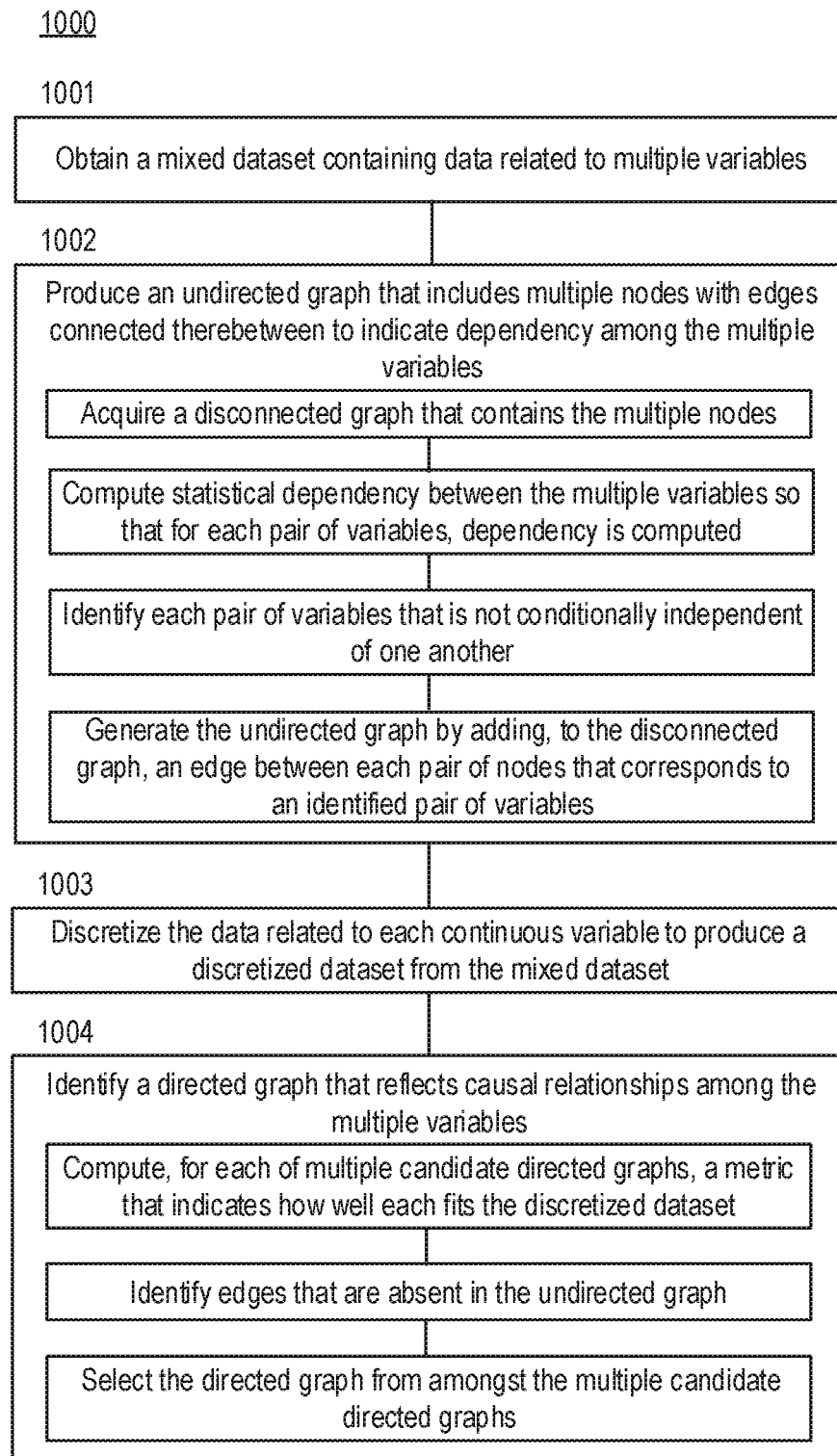
FIG. 10 depicts a flow diagram of a process for establishing causal dependency among the continuous and discrete variables in a mixed dataset.

FIG. 10 depicts a flow diagram of a process 1000 for establishing causal dependency among the continuous and discrete variables in a mixed dataset. Initially, an intelligence platform obtains a mixed dataset that contains data related to multiple variables (step 1001). Then, the intelligence platform can produce an undirected graph that includes multiple nodes with edges connected therebetween to indicate dependency among the multiple variables (step 1002). In the undirected graph, the multiple nodes are representative of the multiple variables, while the edges indicate dependency among the multiple variables. The undirected graph may be created from a fully disconnected graph that is altered to indicate causal relationships amongst the multiple variables. For example, the intelligence platform may acquire a disconnected graph that contains multiple nodes, each of which represents a corresponding variable, and then exhaustively compute statistical dependency between the multiple variables so that a metric indicative of dependency is computed for each pair of variables. Statistical dependency may be computed by performing a FCIT so as to determine conditional independence between each pair of variables. Based on the metrics, the intelligence platform can identify each pair of variables that is not conditionally independent of one another and then add edges to the disconnected graph accordingly. More specifically, the intelligence platform may generate the undirected graph by adding, to the disconnected graph, an edge between each pair of nodes that corresponds to a pair of variables identified as not being conditionally independent of one another.

After the undirected graph has been produced, the intelligence platform discretizes the data related to each continuous variable to produce a discretized dataset from the mixed dataset (step 1003). Assume, for example, that the undirected graph is produced using a disconnected graph as discussed above. In such embodiments, the intelligence platform may determine, for each node corresponding to a continuous variable, one or more candidate policies for discretization based on the undirected graph. For a given node corresponding to a continuous variable, the intelligence platform may identify neighboring nodes, if any, that correspond to discrete variables and then use those discrete variables as target variables in a supervised discretization algorithm to discover candidate label sets for discretization. Each candidate label set learned from a discrete variable may be representative of a candidate policy for discretization. After a policy is selected from amongst the candidate policies by the intelligence platform, the data related to the continuous variable is discretized in accordance with the selected policy.

The intelligence platform can then identify a directed graph that reflects causal relationships among the multiple variables (step 1004). Generally, the directed graph is selected from amongst multiple candidate directed graphs by the intelligence platform. For example, the intelligence platform may compute, for each candidate directed graph, a metric that indicates how well the candidate directed graph fits the discretized dataset. Moreover, the intelligence platform may identify edges that are absent in the undirected graph produced from the mixed dataset. The intelligence platform may select the directed graph from amongst the multiple candidate directed graphs based on inputs that include (i) the metrics and (ii) the identified edges.

Figure 11:
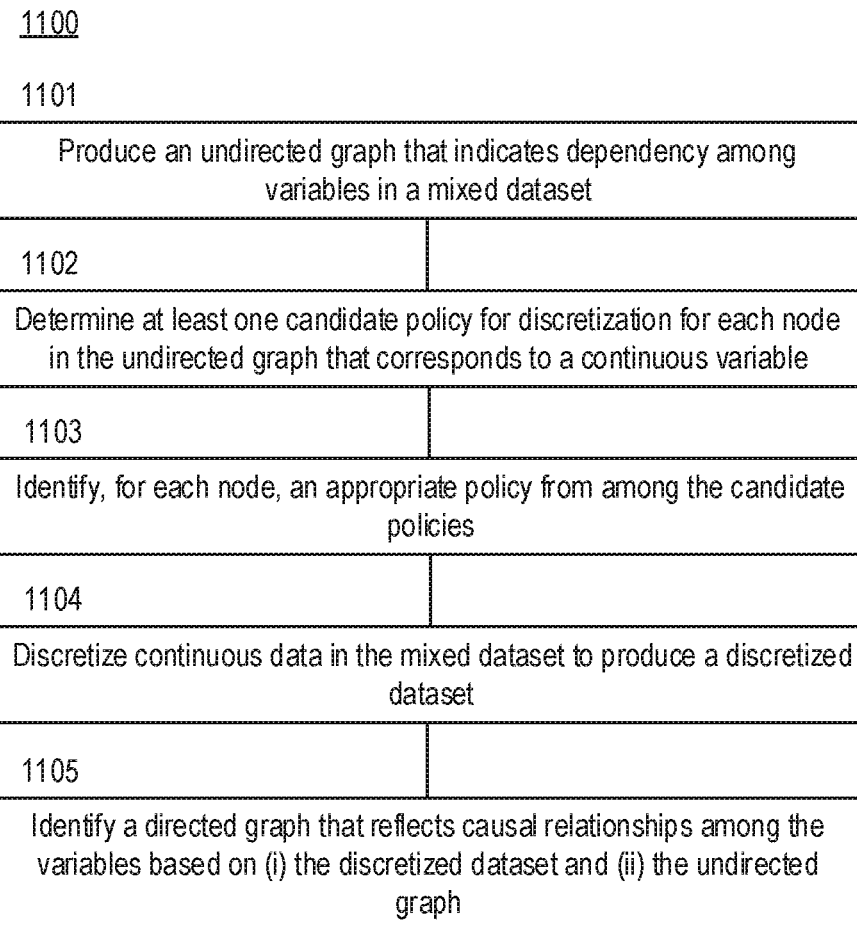
FIG. 11 includes a flow diagram of another process for establishing causal dependency among the continuous and discrete variables in a mixed dataset.

FIG. 11 includes a flow diagram of another process 1100 for establishing causal dependency among the continuous and discrete variables in a mixed dataset. As discussed above, an intelligence platform may begin the process 1100 by producing an undirected graph that indicates dependency among the variables in a mixed dataset (step 1101). For example, the intelligence platform may compute dependency between the variables in an exhaustive manner so that for each pair of variables, a metric indicative of dependency is computed. Then, using those metrics, the intelligence platform can generate the undirected graph by adding, to a disconnected graph containing nodes that are representative of the variables, edges between the nodes corresponding to variables that are determined to be dependent on one another. At a high level, the undirected graph is representative of a skeletal frame of nodes that are connected to one another so as to indicate dependency. Each node in the undirected graph is representative of either a continuous variable or a discrete variable.

Thereafter, the intelligence platform can determine at least one candidate policy for discretization for each node in the undirected graph that corresponds to a continuous variable (step 1102). As discussed above, this can be accomplished by identifying neighboring nodes in the undirected graph that correspond to discrete variables. For example, assume that the intelligence platform is interested in determining candidate policies for a given node corresponding to a given continuous variable. Generally, the number of candidate policies will correspond to the number of nodes neighboring the given node that correspond to discrete variables. The exception is if the given node does not have any neighboring nodes corresponding to discrete variables, in which case all nodes corresponding to discrete variables may be treated neighbors. The intelligence platform can derive each candidate policy by analyzing data in the mixed dataset that is associated with the corresponding discrete variable. For example, each candidate policy may be derived based on the label(s) used to categorize the data related to the corresponding discrete variable.

The intelligence platform can then identify, for each node corresponding to a continuous variable, an appropriate policy from amongst the one or more candidate policies (step 1103). If a single candidate policy was determined, then the intelligence platform can simply select that candidate policy for discretization. However, if multiple candidate policies were determined, then the intelligence platform must select one for discretization. To accomplish this, the intelligence platform may determine new sets of neighboring nodes of a given node with the data as discretized in accordance with each candidate policy and then select whichever candidate policy results in an output closest to the original set of neighboring nodes as determined from the undirected graph. Using the policy identified for each node, the intelligence platform can discretize continuous data in the mixed dataset to produce a discretized dataset (step 1104).

Moreover, the intelligence platform can identify a directed graph that reflects causal relationships among the variables based on (i) the discretized dataset and (ii) the undirected graph (step 1105). To accomplish this, the intelligence platform may execute a probabilistic machine learning algorithm that considers forbidden edges as input. The forbidden edges may be those edges that are absent in the undirected graph. Thus, edges that are absent in the undirected graph may be forbidden in the directed graph. In some embodiments, the directed graph is representative of a causal Bayesian network as mentioned above. In such embodiments, the directed graph may be identified by greedily searching over a series of causal Bayesian networks and outputting a highest scoring Bayesian network as the directed graph.

Unless contrary to physical possibility, it is envisioned that the steps described above may be performed in various sequences and combinations. For example, an intelligence platform may simultaneously or sequentially execute steps of these processes in order to determine causal dependency among tends, hundreds, or thousands of variables.

Other steps may also be included in some embodiments. For example, the intelligence platform may receive input indicative of a selection of the mixed dataset for which causal dependency is to be determined. As another example, the intelligence platform may receive input indicative of a specification or selection of a policy for discretizing data related to a continuous variable. For instance, the intelligence platform may determine one or more candidate policies for discretizing the data related to a continuous variable as discussed above. Those candidate policies may be posted to an interface for review by an individual responsible for overseeing the causal determination process. Additionally or alternatively, the individual responsible for overseeing the causal determination process may be permitted to define how the data related to a continuous variable should be discretized.

Processing System

Figure 12:
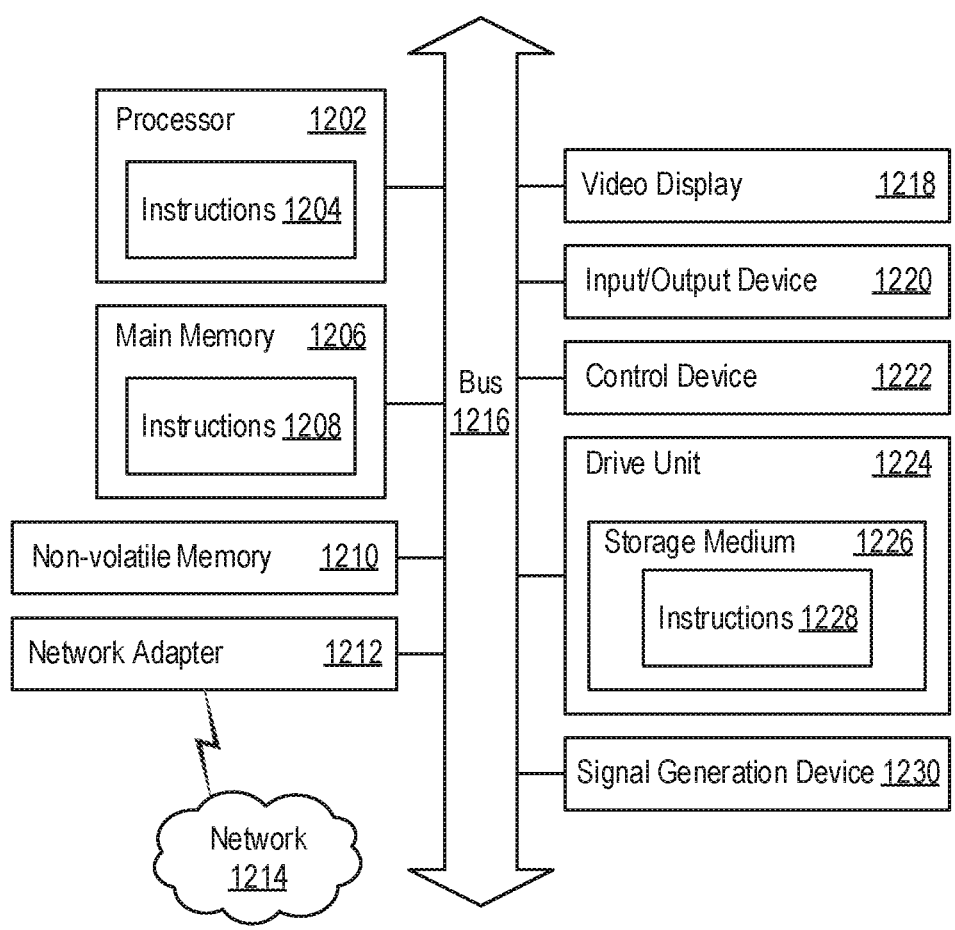
FIG. 12 is a block diagram illustrating an example of a processing system in which at least some operations described herein can be implemented.

FIG. 12 is a block diagram illustrating an example of a processing system 1200 in which at least some operations described herein can be implemented. For example, components of the processing system 1200 may be hosted on a computing device that includes an intelligence platform (e.g., intelligence platform 102 of FIG. 1 or intelligence platform 210 of FIGS. 2 and 9).

The processing system 1200 may include a processor 1202, main memory 1206, non-volatile memory 1210, network adapter 1212 (e.g., a network interface), video display 1218, input/output device 1220, control device 1222 (e.g., a keyboard, pointing device, or mechanical input such as a button), drive unit 1224 that includes a storage medium 1226, or signal generation device 1230 that are communicatively connected to a bus 1216. The bus 1216 is illustrated as an abstraction that represents one or more physical buses and/or point-to-point connections that are connected by appropriate bridges, adapters, or controllers. The bus 1216, therefore, can include a system bus, Peripheral Component Interconnect (PCI) bus, PCI-Express bus, HyperTransport bus, Industry Standard Architecture (ISA) bus, Small Computer System Interface (SCSI) bus, Universal Serial Bus (USB), Inter-Integrated Circuit (I2C) bus, or a bus compliant with Institute of Electrical and Electronics Engineers (IEEE) Standard 1394.

The processing system 1200 may share a similar computer processor architecture as that of a computer server, router, desktop computer, tablet computer, mobile phone, video game console, wearable electronic device (e.g., a watch or fitness tracker), network-connected ("smart") device (e.g., a television or home assistant device), augmented or virtual reality system (e.g., a head-mounted display), or another electronic device capable of executing a set of instructions (sequential or otherwise) that specify action(s) to be taken by the processing system 1200.

While the main memory 1206, non-volatile memory 1210, and storage medium 1226 are shown to be a single medium, the terms "storage medium" and "machine-readable medium" should be taken to include a single medium or multiple media that stores one or more sets of instructions 1226. The terms "storage medium" and "machine-readable medium" should also be taken to include any medium that is capable of storing, encoding, or carrying a set of instructions for execution by the processing system 1200.

In general, the routines executed to implement the embodiments of the present disclosure may be implemented as part of an operating system or a specific application, component, program, object, module, or sequence of instructions (collectively referred to as "computer programs"). The computer programs typically comprise one or more instructions (e.g., instructions 1204, 1208, 1228) set at various times in various memories and storage devices in a computing device. When read and executed by the processor 1202, the instructions cause the processing system 1200 to perform operations to execute various aspects of the present disclosure.

While embodiments have been described in the context of fully functioning computing devices, those skilled in the art will appreciate that the various embodiments are capable of being distributed as a program product in a variety of forms. The present disclosure applies regardless of the particular type of machine- or computer-readable medium used to actually cause the distribution. Further examples of machine- and computer-readable media include recordable-type media such as volatile and non-volatile memory devices 1210, removable disks, hard disk drives, optical disks (e.g., Compact Disk Read-Only Memory (CD-ROMS) and Digital Versatile Disks (DVDs)), cloud-based storage, and transmission-type media such as digital and analog communication links.

The network adapter 1212 enables the processing system 1200 to mediate data in a network 1214 with an entity that is external to the processing system 1200 through any communication protocol supported by the processing system 1200 and the external entity. The network adapter 1212 can include a network adaptor card, a wireless network interface card, a switch, a protocol converter, a gateway, a bridge, a hub, a receiver, a repeater, or a transceiver that includes an integrated circuit (e.g., enabling communication over Bluetooth or Wi-Fi).

The techniques introduced here can be implemented using software, firmware, hardware, or a combination of such forms. For example, aspects of the present disclosure may be implemented using special-purpose hardwired (i.e., non-programmable) circuitry in the form of application-specific integrated circuits (ASICs), programmable logic devices (PLDs), field-programmable gate arrays (FPGAs), and the like.

Remarks

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling those skilled in the relevant art to understand the claimed subject matter, the various embodiments, and the various modifications that are suited to the particular uses contemplated.

Although the Detailed Description describes certain embodiments and the best mode contemplated, the technology can be practiced in many ways no matter how detailed the Detailed Description appears. Embodiments may vary considerably in their implementation details, while still being encompassed by the specification. Particular terminology used when describing certain features or aspects of various embodiments should not be taken to imply that the terminology is being redefined herein to be restricted to any specific characteristics, features, or aspects of the technology with which that terminology is associated. In general, the terms used in the following claims should not be construed to limit the technology to the specific embodiments disclosed in the specification, unless those terms are explicitly defined herein. Accordingly, the actual scope of the technology encompasses not only the disclosed embodiments, but also all equivalent ways of practicing or implementing the embodiments.

The language used in the specification has been principally selected for readability and instructional purposes. It may not have been selected to delineate or circumscribe the subject matter. It is therefore intended that the scope of the technology be limited not by this Detailed Description, but rather by any claims that issue on an application based hereon. Accordingly, the disclosure of various embodiments is intended to be illustrative, but not limiting, of the scope of the technology as set forth in the following claims.

What is claimed is:

1. A method comprising:
   accessing a mixed dataset that contains data related to multiple variables, the multiple variables including at least one continuous variable and at least one discrete variable;
   producing, prior to discretization, an undirected graph that indicates dependency among the multiple variables of the mixed dataset;
   discretizing the data related to each continuous variable in a decreasing ratio based on a number of discrete variables neighboring each continuous variable in the undirected graph; and
   identifying a directed graph that reflects causal relationships among the multiple variables by performing a greedy search of multiple candidate directed graphs using a scoring function that evaluates how well each candidate directed graph fits the discretized data.

2. The method of claim 1, further comprising displaying of a visual representation of the directed graph on an interface so as to visually convey the causal relationships among the multiple variables.

3. The method of claim 1, wherein performing the greedy search of multiple candidate directed graphs comprises:
   applying a Bayesian algorithm that heuristically searches the multiple candidate directed graphs and returns whichever candidate directed graph has a highest score.

4. The method of claim 1, wherein discretizing the data comprises:
   executing a Fast Conditional Independence Test (FCIT) between the multiple variables so that for each pair of variables, a metric indicative of dependency is determined;
   identifying, based on the metrics indicative of dependency, each pair of variables that is not conditionally independent of one another; and
   generating the undirected graph by adding, to a disconnected graph containing multiple nodes that are representative of the multiple variables, an edge between each pair of nodes that corresponds to an identified pair of variables.

5. The method of claim 4, further comprising excluding edges absent in the undirected graph from the directed graph.

6. The method of claim 1, further comprising performing, based on the directed graph, analytics on the causal relationships among the multiple variables.

7. A non-transitory computer-readable medium with instructions stored thereon that, when executed by a processor, cause the processor to perform operations comprising:
accessing a mixed dataset that contains data related to multiple variables, the multiple variables including at least one continuous variable and at least one discrete variable;
producing, prior to discretization, an undirected graph that includes multiple nodes with edges connected therebetween;
discretizing the data related to each continuous variable in the undirected graph to produce a discretized dataset from the mixed dataset; and
generating a directed graph that reflects causal relationships among the multiple variables by:
determining, for each of multiple candidate directed graphs, a metric that indicates how well a corresponding candidate directed graph fits the discretized dataset,
identifying edges that are absent in the undirected graph, and
selecting the directed graph from amongst the multiple candidate directed graphs based on (i) the multiple metrics and (ii) the identified edges.

8. The non-transitory computer-readable medium of claim 7, wherein the edges that are absent in the undirected graph are forbidden in the directed graph.

9. The non-transitory computer-readable medium of claim 7, wherein producing the undirected graph that includes multiple nodes with edges connected therebetween comprises:
acquiring a disconnected graph that contains the multiple nodes;
determining statistical dependency between the multiple variables;
identifying, based on the statistical dependency, pairs of variables that are not conditionally independent of one another; and
generating the undirected graph by adding, to the disconnected graph, an edge between each pair of nodes that corresponds to an identified pair of variables.

10. The non-transitory computer-readable medium of claim 9, wherein determining statistical dependency between the multiple variables involves performing a fast conditional independence test (FCIT) to determine conditional independence between each pair of variables.

11. The non-transitory computer-readable medium of claim 8, wherein discretizing the data related to each continuous variable comprises;
for each node in the undirected graph that corresponds to a continuous variable,
determining one or more candidate policies for discretization,
selecting a policy from amongst the one or more candidate policies, and
discretizing the data related to the continuous variable in accordance with the selected policy.

12. The non-transitory computer-readable medium of claim 10, wherein determining one or more candidate policies for discretization comprises:
identifying neighboring nodes, if any, that correspond to discrete variables; and
using the discrete variables as target variables in a supervised discretization algorithm to discover candidate label sets for discretization;
wherein each candidate label set is representative of a candidate policy.

13. A system comprising:
at least one memory device; and
at least one processor coupled to the at least one memory device that causes the system to perform operations comprising:
producing an undirected graph that indicates dependency among variables in a mixed dataset by:
computing dependency between the variables; and
generating, prior to discretization, the undirected graph by adding, to a disconnected graph containing nodes that are representative of the variables, edges between nodes corresponding to variables that are not independent of one another;
discretizing continuous data in a decreasing ratio based on a number of discrete variables neighboring each continuous variable in the undirected graph in the mixed dataset to produce a discretized dataset; and
determining, based on the discretized dataset and the undirected graph, a directed graph that reflects causal relationships among the variables.

14. The system of claim 13, wherein:
the undirected graph is a skeletal frame of nodes that are connected to one another; and each node is representative of a continuous variable or a discrete variable.

15. The system of claim 14, further comprising:
for each node in the undirected graph that corresponds to a continuous variable,
determining a candidate policy for discretization by:
identifying a neighboring node that corresponds to a discrete variable, and
deriving the candidate policy based on analysis of data in the mixed dataset that is associated with the discrete variable.

16. The system of claim 15, wherein the candidate policy is derived based on one or more labels used to categorize the data.

17. The system of claim 15, wherein a given node in the undirected graph that corresponds to a continuous variable has multiple neighboring nodes that correspond to discrete variables such that multiple candidate policies for discretization are determined.

18. The system of claim 17, further comprising:
Identifying an appropriate policy from amongst the multiple candidate policies by:
determining new sets of neighboring nodes of the given node with the data as discretized in accordance with each candidate policy; and
selecting whichever candidate policy resulted in an output closest to an original set of neighboring nodes.

19. The system of claim 13, wherein identifying the directed graph that reflects causal relationships among the variables is performed by a probabilistic machine learning algorithm that considers forbidden edges as input, the forbidden edges being those edges that are absent in the undirected graph.

20. The system of claim 13, wherein the directed graph is representative of a causal Bayesian network, and wherein identifying the directed graph that reflects causal relationships among the variables comprises greedily searching over a series of causal Bayesian networks and outputting a highest scoring Bayesian network as the directed graph.

* * * * *